US007346789B2

(12) United States Patent
Shimomura et al.

(10) Patent No.: US 7,346,789 B2
(45) Date of Patent: Mar. 18, 2008

(54) MULTIMEDIA REPRODUCING APPARATUS HAVING FUNCTION FOR EFFICIENT USE OF MEMORY

(75) Inventors: Tomonori Shimomura, Kanagawa (JP); Takashi Hatakeda, Kanagawa (JP); Takeshi Kono, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 141 days.

(21) Appl. No.: 11/291,490

(22) Filed: Dec. 1, 2005

(65) Prior Publication Data

US 2006/0123214 A1   Jun. 8, 2006

(30) Foreign Application Priority Data

Dec. 3, 2004   (JP)   ............... 2004-352099

(51) Int. Cl.
*G06F 1/26* (2006.01)
*G11C 29/00* (2006.01)

(52) U.S. Cl. ............... 713/300; 713/310; 713/340; 715/502; 715/526; 719/328; 719/329; 719/330; 719/332; 345/418; 345/544; 345/545; 345/548; 714/2; 714/763; 714/764

(58) Field of Classification Search ............... 713/300
See application file for complete search history.

(56) References Cited

U.S. PATENT DOCUMENTS 5,710,930 A * 1/1998 Laney et al. ............... 713/300

| 6,425,020 | B1 * | 7/2002 | Sharma ............... 710/20 |
| 6,741,256 | B2 * | 5/2004 | Emberling ............... 345/540 |
| 7,174,451 | B2 * | 2/2007 | Zimmer et al. ............... 713/2 |
| 7,228,444 | B2 * | 6/2007 | Westerinen et al. ............... 713/300 |
| 2004/0158767 | A1 * | 8/2004 | Naitoh et al. ............... 714/5 |
| 2004/0189809 | A1 * | 9/2004 | Choi ............... 348/207.1 |

FOREIGN PATENT DOCUMENTS

JP   6-180668   6/1994

OTHER PUBLICATIONS

Notification of Reason(s) for Refusal dated Sep. 25, 2007, from the corresponding Japanese Application.

* cited by examiner

*Primary Examiner*—A. Elamin
*Assistant Examiner*—Nitin C. Patel
(74) *Attorney, Agent, or Firm*—Katten Muchin Rosenman LLP

(57) ABSTRACT

A multimedia reproducing apparatus having excellent operability and amenity. In the apparatus, a ROM contains an OS including a system program and a utility program. A control unit controls at suspend function by which data indicating the state of contents of display and contents of execution before interruption of a power supply to a CPU is stored as save data so that the power supply, after interrupted, can be resumed from the state before interruption. A main memory includes a first area for the save data to be written to when suspend is executed, and a second area for data of an external program to be written to when the external program is executed. The system program has the functions of writing the save data to the first area when suspend is executed, and writing the utility program from the ROM to the first area when suspend is not executed and the utility program is called from the external program.

3 Claims, 5 Drawing Sheets

MULTIMEDIA REPRODUCING APPARATUS HAVING FUNCTION FOR EFFICIENT USE OF MEMORY

BACKGROUND OF THE INVENTION

1. Field of the Invention

The invention relates to a multimedia reproducing apparatus. In particular, the invention relates to a technology for drawing processing in multimedia reproduction.

2. Description of the Related Art

In recent years, digital home appliances including hard disk recorders, DVD (Digital Versatile Disc) recorders, hybrid machines thereof, and digital cameras have been spreading rapidly. The prevalence of theme products not only fuels demand for the products themselves but also boosts demand for such digital contents as motion pictures, music, and games, and thus is attracting attention now as an engine for economic recovery.

Many of the digital home appliances assume household use in living rooms. For the sake of creating higher demand for the products and contents, however, it is considered necessary to popularize appliances with which a variety of contents can be enjoyed in any location. To meet such requests, it is strongly desired to provide performance, operability, and amenities comparable to those of digital home appliances having TV screens.

SUMMARY OF THE INVENTION

In an embodiment of the present invention, a multimedia reproducing apparatus comprises: a central processing unit which executes a program; a main memory for data to be written to; a ROM which contains an operating system including a system program and a utility program; and a control unit which controls a suspend function of storing data indicating at least either contents of display or contents of execution prior to interruption of a power supply to the central processing unit as save data so that the power supply, after interrupted, can be resumed from a state where the contents of display and the contents of execution prior to the interruption of the power supply are restored. The main memory includes a first area for the save data to be written to when the suspend function is executed, and a second area for data of an external program to be written to when the external program is executed by the central processing unit. The system program makes the central processing unit execute the functions of writing the save data to the first area when the suspend function is executed, and writing the utility program from the ROM to the first area when the suspend function is not executed and the utility program is called from the external program written to and executed in the second area.

Here, the "system program" may include a program of a utility driver for controlling the utility program, and a program of a kernel of the operating system. The kernel may include the utility program. The "first area" may be an area that is expressed as "suspend area" or "utility area" in the following embodiment. The "second area" may be an area that is expressed as "program area" in the following embodiment. The main memory may also include an area for the kernel to be written to. According to this aspect, it is possible to use the areas of the main memory efficiently.

Another aspect of the present invention is also a multimedia reproducing apparatus. This apparatus comprises: a central processing unit which executes a program; a main memory for data to be written to; a ROM which contains an operating system including a system program and a utility program, and a drawing processing unit which performs drawing processing. The drawing processing unit has a register for a value necessary for drawing processing to be written to. When the utility program is called from an external program executed by the central processing unit, the utility program saves the value stored in the register to the main memory and then sends a drawing instruction to the drawing processing unit, and finishes sending the drawing instruction before the utility program restores the value saved in the main memory to the register and then switches to the processing of the external program.

The "value necessary for drawing processing" may be data that shows the mode of display of a drawing target, such as a color-indicating value, an alpha value in alpha blending, an address of a storage location of texture, and a value showing the contents of processing. According to this aspect, it is possible to use the register in the drawing processing unit efficiently.

Yet another aspect of the present invention is also a multimedia reproducing apparatus. This apparatus comprises: a central processing unit which executes a program; a main memory for data to be written to; a ROM which contains an operating system including a system program and a utility program; and a drawing processing unit which performs drawing processing. The drawing processing unit has a video memory for data on an image to be drawn to be written to. The video memory includes a frame buffer area for data on a frame image to be drawn to be written to, and an offscreen buffer area for texture to be used in drawing processing to be written to. When the utility program is called from an external program executed by the central processing unit, the utility program sends a data string of the image to be drawn to the frame buffer area if the external program does not specify any write destination of the image to be drawn, and sends the data string of the image to be drawn to the offscreen buffer area if the external program specifies the offscreen buffer area as the write destination of the image to be drawn.

For the "frame buffer area," two frames of area may be reserved including a first frame buffer area and a second frame buffer area, for example. The data string of the image may be written to either one of the areas. According to this aspect, it is possible to use the video memory in the drawing processing unit efficiently.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
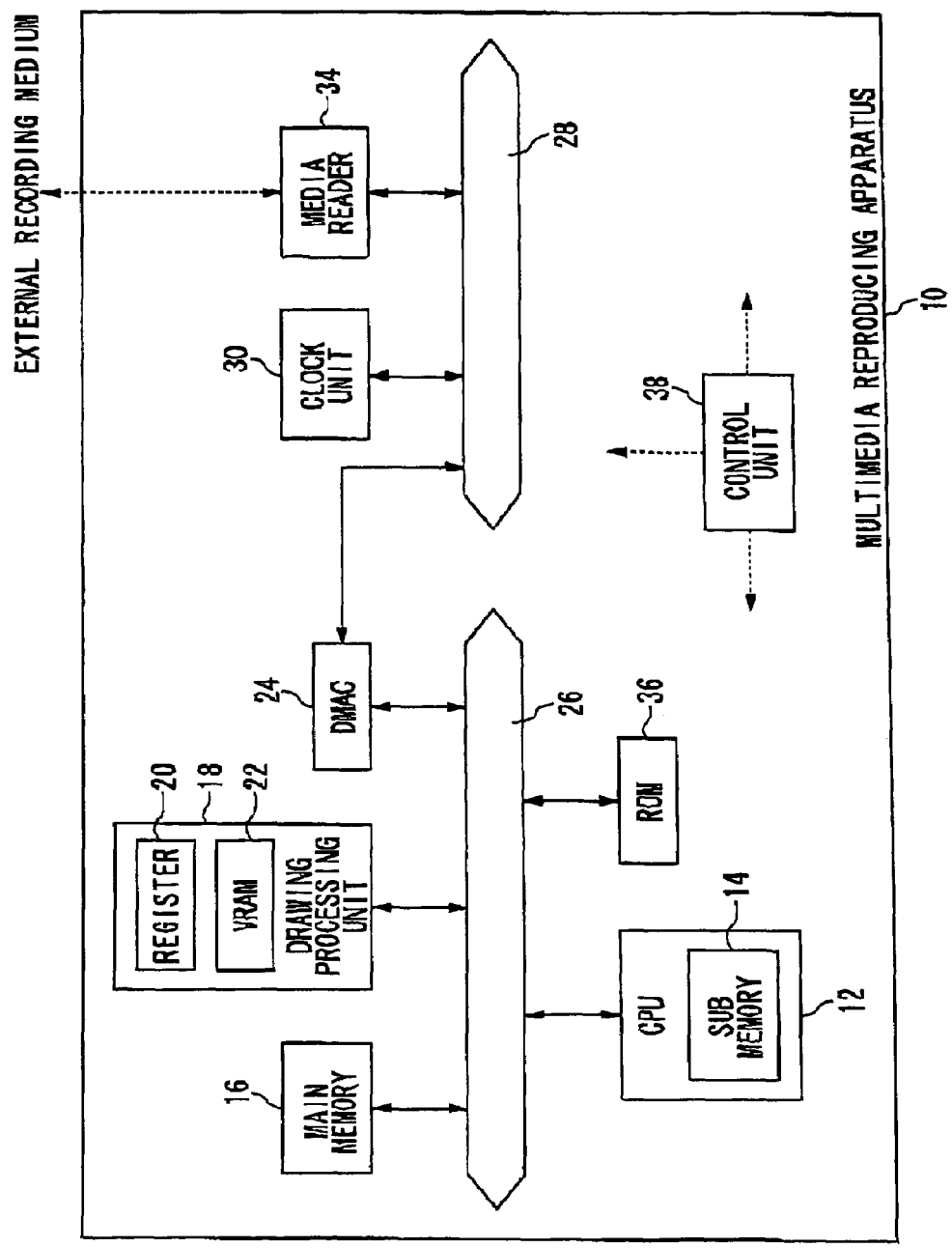
FIG. 1 is a diagram showing the basic configuration of a multimedia reproducing apparatus.

A multimedia reproducing apparatus according to the present embodiment is a portable hybrid device capable of reproducing or executing a plurality of types of contents including still images, moving images, music, and game and other programs. This apparatus has a small, built-in liquid crystal display panel. For operation, such means as an onscreen GUI (Graphical User Interface), a cross key, and various types of keys are provided.

Conventionally, game programs often include the functions of storing and reading values that show the intermediate states of the games, or so-called save data, am well as the functions of an onscreen keyboard and the like. These functions are created under the original designs and operation methods determined by the creators of the respective game contents. The functions might thus be confusing to users and even burdensome to the creators of the game contents since the designs and operability have nothing in common with other external programs. Morover, the necessity to create the functions for each individual external program increases the probability of occurrence of programming mistakes accordingly, which can also be troublesome to the contents creators. In the present embodiment, functions to executed frequently in a plurality of external programs are separated and prepared in the form of utility programs, and are stored into a ROM as part of the operating system. As a result, it is possible to provide the individual unitity functions under a standardized design and operability. This can not only facilitate user operation, but also liberate the creators of the game contents from troublesom creation of the utility functions.

The multimedia reproducing apparatus according to the present embodiment also has a suspend function, or the function of storing the state of the contents of display and the contents of execution before interruption of a power supply to its central processing unit (hereinafter, referred to as "CPU") and the like so that the power supply, after interrupted, can be resumed from the state before the interruption of the power supply. For that purpose, a predetermined area of the main memory is reserved as an area where data indicating the state of the contents of display and the contents of execution at suspend time is written to. Nevertheless, the area reserved for suspend becomes idle when programs are executed, i.e., while suspend is not executed. That area is then freed for other purposes. In the present embodiment, the area reserved for suspend is used as an area for the utility programs to be written to other than when suspend is executed. Consequently, the utility programs are not written to the area to be used by external programs. Since the area for external programs will not be made tight, the creators of the game contents can use the system utility programs without substantially decreasing the area to be used by the external programs. This secures the flexibility of the contents creation.

In the multimedia reproducing apparatus of the present embodiment, when utility programs are called from external programs, they save the register values in the drawing processing unit and then execute their own drawing processing, and finish the drawing processing before they restore the register values in the drawing processing unit. In the present embodiment, various utility functions originally included in the external programs themselves are separated from the external programs into utility programs. As a result, the drawing processing of an external program can be interrupted by the drawing processing of a utility program, so that the drawing processing unit is shared between the two programs. It is typically expected that once values necessary for drawing are written to the register in the drawing processing unit by external programs; the register values remain unchanged unless rewritten by the external programs themselves. The external programs assume that state in continuing processing Nevertheless, the register values in the drawing processing unit may be overwritten since the drawing processing of the external programs is subject to interruption by the drawing processing of the utility programs. Then, the register values are backed up at the point before the drawing processing of the utility programs, and restored after the drawing processing by the utility programs, so that the register values expected by the external programs can be maintained. This makes it possible for the creators of the external programs to create external programs that use the utility programs, without worrying about changes in the register values.

Moreover, in the multimedia reproducing apparatus of the present embodiment, the write destination of images generated by the utility programs can be specified by the external programs. If the external programs do not specify any write destination, the images generated by the utility programs are written to a normal frame buffer area. If the external programs specify the write destination, the images generated by the utility programs are written to an offscreen buffer area. The images written to the offscreen buffer area may be displayed in a size smaller than the frame size by the external programs. The images may be used in such a manner that texture is mapped onto spherical surfaces. As above, even when the various utility functions originally included in the external programs are separated from the external programs into the utility programs, the write destination of the images generated by the utility programs can be specified to achieve flexible mode of display using the images.

FIG. 1 shows the basic configuration of a multimedia reproducing apparatus 10. The multimedia reproducing apparatus 10 comprises a CPU 12, a main memory 16, a drawing processing unit 18, a DMAC (Direct Memory Access Controller) 24, a main bus 26, an I/O bus 28, a clock unit 30, a media reader 34, a ROM 36, and a control unit 38.

The main bus 26 is connected with the CPU 12, the main memory 16, the drawing processing unit 18, the DMAC 24, and the ROM 36, and transfers date between the individual units tat high speed. The main memory 16 stores a program of primary concern, such as a game program. Data necessary for executing the program is stored as well. The program stored in the main memory 16 is executed by the CPU 12. The CPU 12 includes a sub memory 14, and stores instructions and data of particularly high necessity into the sub memory 14. The ROM 36 contains an operating system including such programs as system programs and utility programs. The system programs include utility drivers for controlling the utility programs, as well as a boot program, a shell program, and a kernel. In the present embodiment, the utility programs are included in the kernel.

The drawing processing unit 18 performs drawing processing based on drawing instructions received from the CPU 12. The drawing processing unit 18 includes a VRAM 22 and a register 20. The VRAM 22 is a video memory to which the data strings of images to be drawn are written. Values necessary for drawing processing are written to the register 20. The DMAC 24 includes input and output ports connected to the main bus 26, and input and output ports connected to the I/O bus 28. The DMAC 24 transfers data between the main bus 26 and the I/O bus 28.

The I/O bus 28 is one for transferring data among the DMAC 24, the clock unit 30, and the media reader 34. The clock unit 30 includes a timer for measuring time and a real-time clock for keeping actual time. The media reader 34 is connected to a drive unit for reading data from an external recording medium such as a small optical disk. When an external recording medium containing a game or other program is inserted into a not-shown slot thereof, the media reader 34 reads at least part of the external program stored in the external recording medium, and transfers it to the main memory 16 through the I/O bus 28, the DMAC 24, and the main bus 26. The CPU 12 executes the external program stored in the main memory 16.

The control unit 38 controls a suspend function of storing data indicating at least either the contents of display or the contents of execution before interruption of a power supply to the CPU 12 and the like as save data so that the power supply, after interrupted, can be resumed from a state where the contents of display and the contents of execution before the interruption of the power supply are restored. The control unit 38 controls the power supply to the individual components At the time of executing suspend, the control unit 38 keeps the main memory 16 powered while interrupting the power supply to the locations other than the main memory 16, such as the CPU 12.

Figure 2:
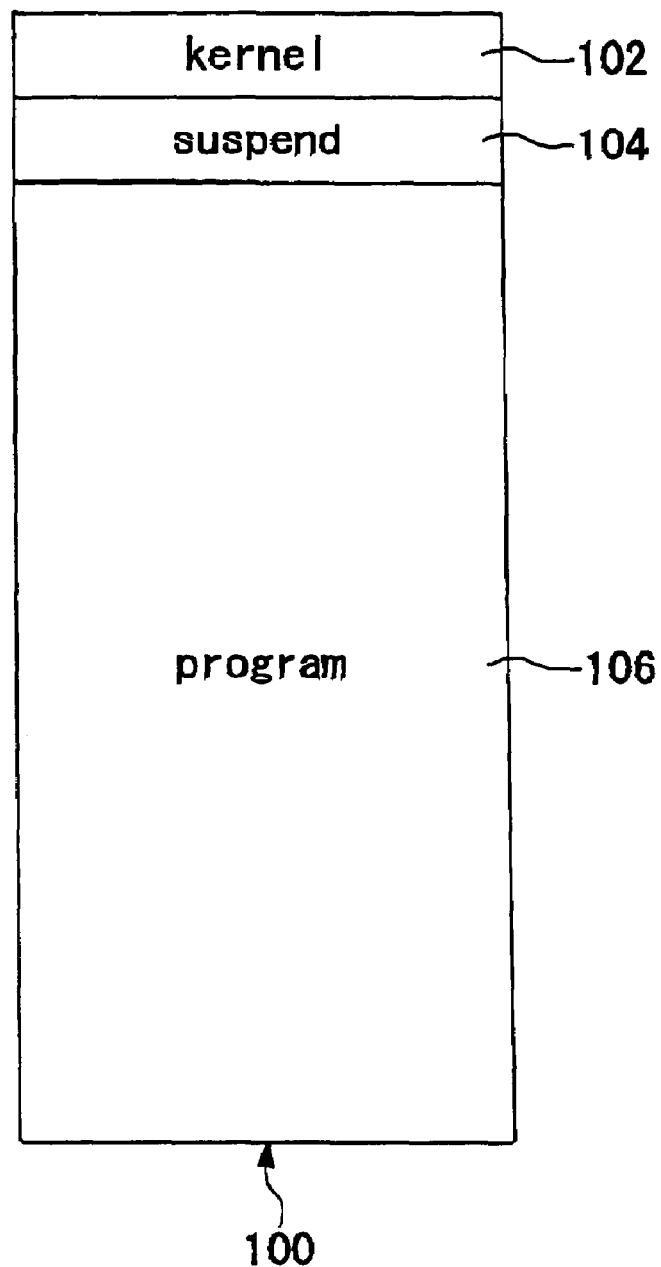
FIG. 2 is a diagram showing the allocation of a data storage area in a main memory during suspend time.

The kernel is written from the ROM 36 to the main memory 16 and remains resident therein. The kernel has the function of writing at least part of data stored in the sub memory 14 and/or the vest 22 to a suspend area of the main memory is as save data when suspend is executed to interrupt the power supply to the CPU 12 and the drawing processing unit 18. The kernel also has the function of writing utility programs from the PROM 36 to the suspend area when the utility programs are called from the external program other than when suspend is executed. Incidentally, if it is instructed to execute suspend while utility programs are in operation, i.e., while the utility programs are stored in the suspend area, the utility programs are terminated immediately. When the termination completes, the external program is informed of it before the suspend is executed When utility programs are called from the external program, they save the values stored in the register 20 to the main memory 16 and then send a drawing instruction to the drawing processing unit 18. The utility programs finish sending the drawing instruction before they restore the values saved in the main memory 16 to the register 20 and then switch to the processing of the external program FIG. 2 shows the allocation of a data storage area in the main memory 16 during suspend time. The data storage area 100 of the main memory 16 includes a kernel area 102, a suspend area 104, and a program area 106. The kernel area 102 is provided as an area to which the kernel for managing the state of execution of programs and the state of the memory is written. For example, an area of 2 MB is allocated for the kernel area 102. The suspend area 104 is provided as an area where data indicating the state of the contents of display or the contents of execution before suspend is written to as save is data when suspend is executed. The data indicating the state of the contents of display or the contents of execution before suspend is read from the sub memory 14 and/or the VRAM 22 and written to the suspend area 104. For example, an area of 1 MB is allocated for the suspend area 104 The program area 106 is one for the shell program to be written to before the game or other external program is executed. The external program is written to the program area 106 when it is executed. For example, an area of 16 MB is allocated for the program area 106. Even when the control unit 38 executes suspend to interrupt the power supply to the CPU 12, the drawing processing unit 18, and the like, the main memory 16 continues to be powered. The contents stored in the main memory 16 are thus maintained.

Figure 3:
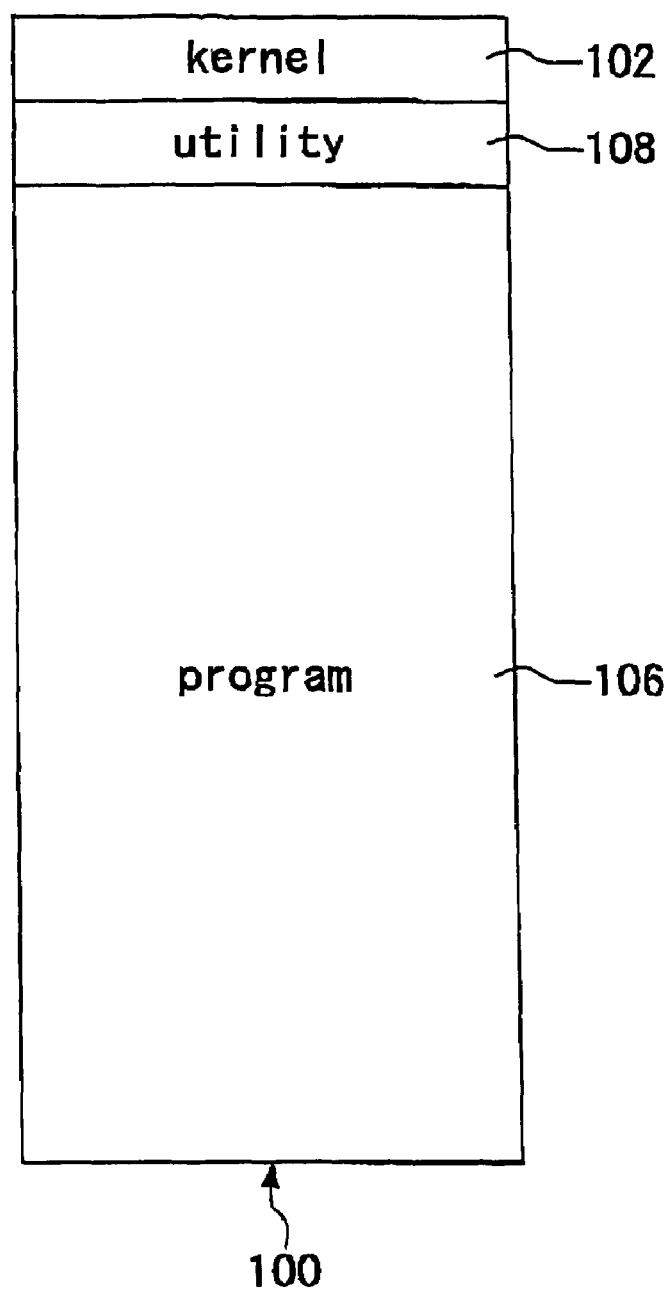
FIG. 3 is a diagram showing the allocation of the data storage area in the main memory during program execution time.

FIG. 3 shows the allocation of the data storage area in the main memory 16 when the external program is executed. As shown in this diagram, during the execution of the external program, the kernel area 102 and the program area 106 are allocated as if the kernel area 102 and the program area 106 are in suspend time in FIG. 2. On the other hand, the area to be used as the suspend area 104 in suspend time is unused by nature while suspend is not executed. That area is thus freed and allocated for a utility area 108. The utility area 108 is an area for various utility programs to be written to when the utility programs are called from the external program which it stored and executed in the program area 106. This precludes the loaded utility programs from making the program area 106 tight. The creators of contents such as game programs can thus use the system utility programs with no substantial decrease in work area, thereby securing the flexibility of the contents creation. Incidentally, if it is instructed to execute suspend while utility programs are running, the area allocated for the utility area 108 will be reallocated for the suspend area 104. The utility programs are thus terminated immediately to free the utility area 108.

Figure 4:
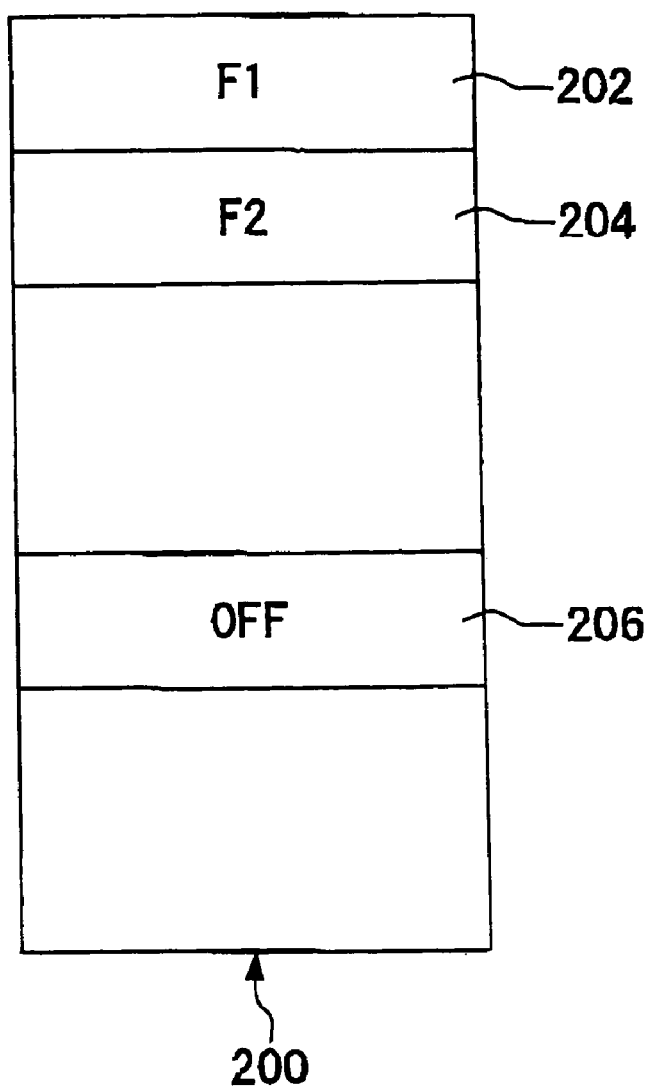
FIG. 4 is a diagram showing the allocation of a data storage area in a VRAM or a drawing processing unit.

FIG. 4 shows the allocation of a data storage area in the VRAM 22 of the main memory 18. The data storage area 200 in the VRAM 22 of the drawing processing unit 18 includes a first frame buffer area 202, a second frame buffer area 204, and an offscreen buffer area 206. The first frame buffer area 202 and the second frame buffer area 204 are used as frame buffers intended for images to be drawn. For example, when an image that is currently being drawn or yet to be drawn is stored in the first frame buffer area 202, the next image to be drawn is written to the second frame buffer area 204. When an image that is currently being drawn or yet to be drawn is stored in the second frame buffer area 204, the next image to be drawn is written to the first frame buffer area 202.

Images generated by the utility programs are written to the first frame buffer area 202 or the second frame buffer area 204 unless the write destination is otherwise specified by the external program. For example, the utility programs lower the tone of a frame image generated by the external program and move the image to the background layer. Images generated by the utility programs are then superimposed on the front layer to mix the screen of the external program and the screen of the utility programs. After the processing is returned from the utility programs to the external program, the external program may perform the processing of superimposing its image on a layer even in front of the layer of the images drawn by the utility programs.

Meanwhile, if the external program specifies the offscreen buffer area 206 as the write destination, the images generated by the utility programs are written to the offscreen buffer area 206. The offscreen buffer area 206 is a buffer for temporarily storing texture which the external program uses for processing images. For example, image data written to the offscreen buffer area 206 by a utility program may be used and processed by the external program so that the image data is displayed in a size smaller than the frame size, or such that the texture is mapped onto a spherical surface.

Figure 5:
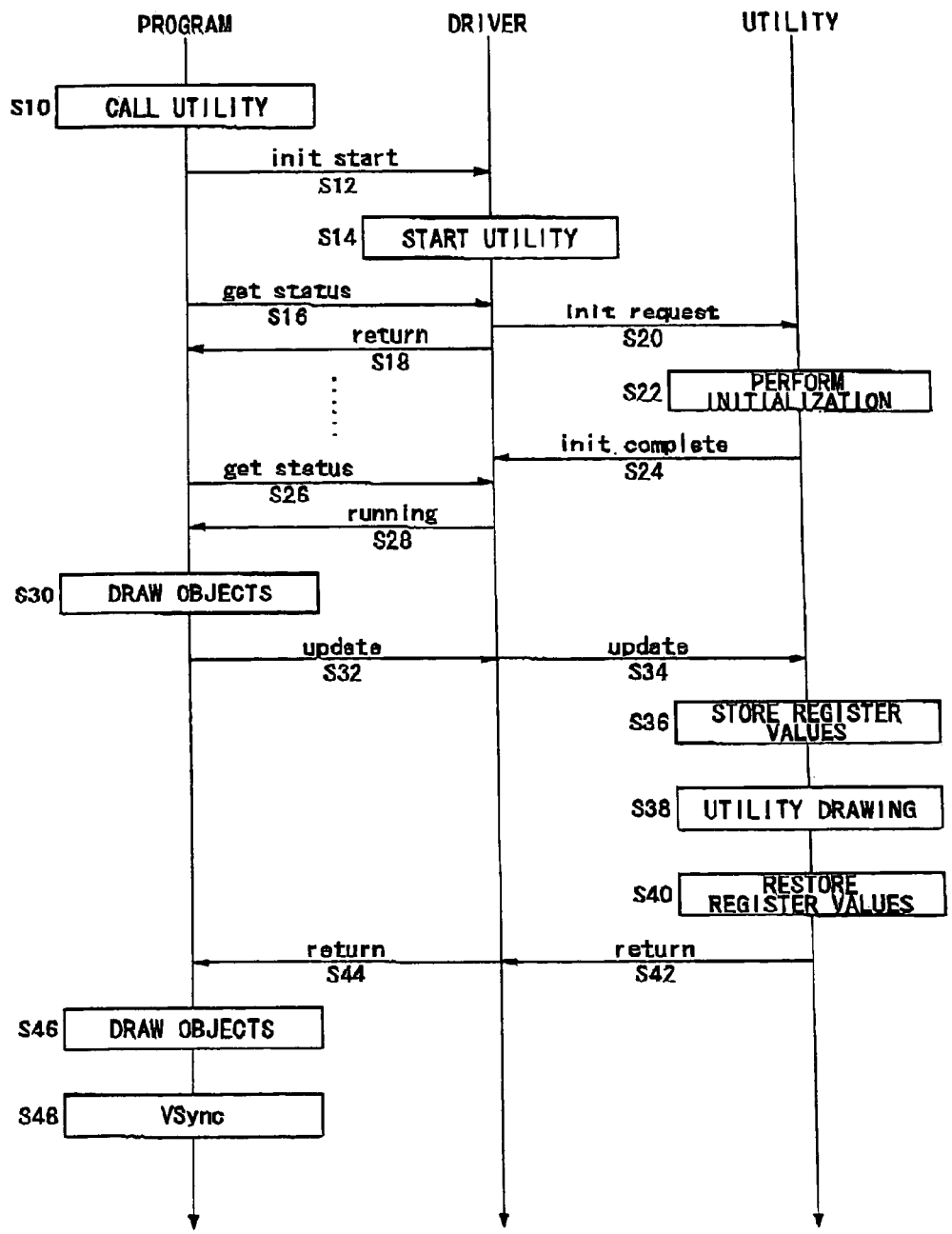
FIG. 5 is a flowchart showing the course of processing of an external program, a utility program, and a utility driver.

FIG. 5 is a flowchart showing the course of processing of an external program, a utility program, and a utility driver.

When a utility program is called from a game or other external program (S10), an instruction for initializing the utility program is sent from the external program to the utility driver in the kernel (S12). The utility driver loads the utility program into the utility area 108 (S14). Meanwhile, the external program sends an instruction for inquiring about the state of execution to the utility driver (S16). If the startup of the utility program is not completed, the utility driver returns that reply to the external program (S18) The external program continues sending the inquiry instruction to the utility driver at intervals of several seconds until it receives from the utility driver the reply that the startup of the utility program is completed.

When the utility driver instructs the utility program for initialization (S20), the utility program performs initialization (S22). When the initialization is completed, the utility program returns that reply to the utility driver (S24) Subsequently, the external program sends the instruction for inquiring about the state of execution to the utility driver (S26). The utility driver returns to the external program the reply that the initialization of the utility program is completed (S28).

In order to draw a frame image to be displayed onscreen in units of objects, for example, the external program sends the data strings of objects to the first frame buffer area 202 or the second frame buffer area 204 of the VRAM 22 in the drawing processing unit 18 (S30). When it finishes sending the data strings, the external program sends to the utility driver an update instruction pertaining to the state of execution of the utility program (S32). The utility driver transfers the update instruction to the utility program (S34). The utility program backs up values necessary for the external program to perform drawing, stored in the register 20 of the drawing processing unit 18, into the utility area 108 of the main memory 16 (S36). Then, the utility program sends data strings as to the contents of display of the utility program to any one of the first frame buffer area 202, the second frame buffer area 204, and the offscreen buffer area 206 of the VRAM 22 in the drawing processing unit 18 (S38). When it finishes sending the data strings, the utility program reads the backup values from the utility area 108 of the main memory 16, and restores them into the register 20 of the drawing processing unit 18 (S40). The utility program returns a reply indicating the completion of display to the utility driver (S42). The utility driver returns to the external program the reply that the drawing processing by the utility program is completed (S44). The external program, as in S30, sends the data strings of objects to the first frame buffer area 202 or the second frame buffer area 204 of the VRAM 22 in the drawing processing unit 18 (S46), and pauses when it finishes sending a single frame of data strings (S48).

Up to this point, the present invention has been described in conjunction with the embodiment thereof. This embodiment has been given solely by way of illustration. It will be understood by those skilled in the art that various modifications may be made to combinations of the foregoing components and processes, and all such modifications are also intended to fall within the scope of the present invention.

What is claimed is:

1. A multimedia reproducing apparatus comprising:
a central processing unit which executes a program;
a main memory for data to be written to;
a ROM which contains an operating system including a system program and a utility program; and
a control unit which controls a suspend function of storing data indicating at least either contents of display or contents of execution prior to interruption of a power supply to the central processing unit as save data so that the power supply, after interrupted, can be resumed from a state where the contents of display and the contents of execution prior to the interruption of the power supply are restored, wherein:
the main memory includes a first area for the save data to be written to when the suspend function is executed, and a second area for data of an external program to be written to when the external program is executed by the central processing unit; and
the system program makes the central processing unit execute the functions of writing the save data to the first area when the suspend function is executed, and writing the utility program from the ROM to the first area when the suspend function is not executed and the utility program is called from the external program written to and executed in the second area.

2. A multimedia reproducing apparatus comprising:
a central processing unit which executes a program;
a main memory for data to be written to;
a ROM which contains an operating system including a system program and a utility program; and
a drawing processing unit which performs drawing processing, wherein:
the drawing processing unit has a register for a value necessary for drawing processing to be written to; and
when the utility program is called from an external program executed by the central processing unit, the utility program saves the value stored in the register to the main memory and then sends a drawing instruction to the drawing processing unit, and finishes sending the drawing instruction before the utility program restores the value saved in the main memory to the register and then switches to the processing of the external program.

3. A multimedia reproducing apparatus comprising:
a central processing unit which executes a program;
a main memory for data to be written to;
a ROM which contains an operating system including a system program and a utility program; and
a drawing processing unit which performs drawing processing, wherein:
the drawing processing unit has a video memory for data on an image to be drawn to be written to;
the video memory includes a frame buffer area for data on a frame image to be drawn to be written to, and an offscreen buffer area for texture to be used in drawing processing to be written to; and
when the utility program is called from an external program executed by the central processing unit, the utility program sends a data string of the image to be drawn to the frame buffer area if the external program does not specify any write destination of the image to be drawn, and sends the data string of the image to be drawn to the offscreen buffer area if the external program specifies the offscreen buffer area as the write destination of the image to be drawn.

* * * * *